2 Sheets—Sheet 1.
C. COLEMAN.
ELECTRIC BURGLAR ALARM.
No. 11,626. Reissued Aug. 17, 1897.
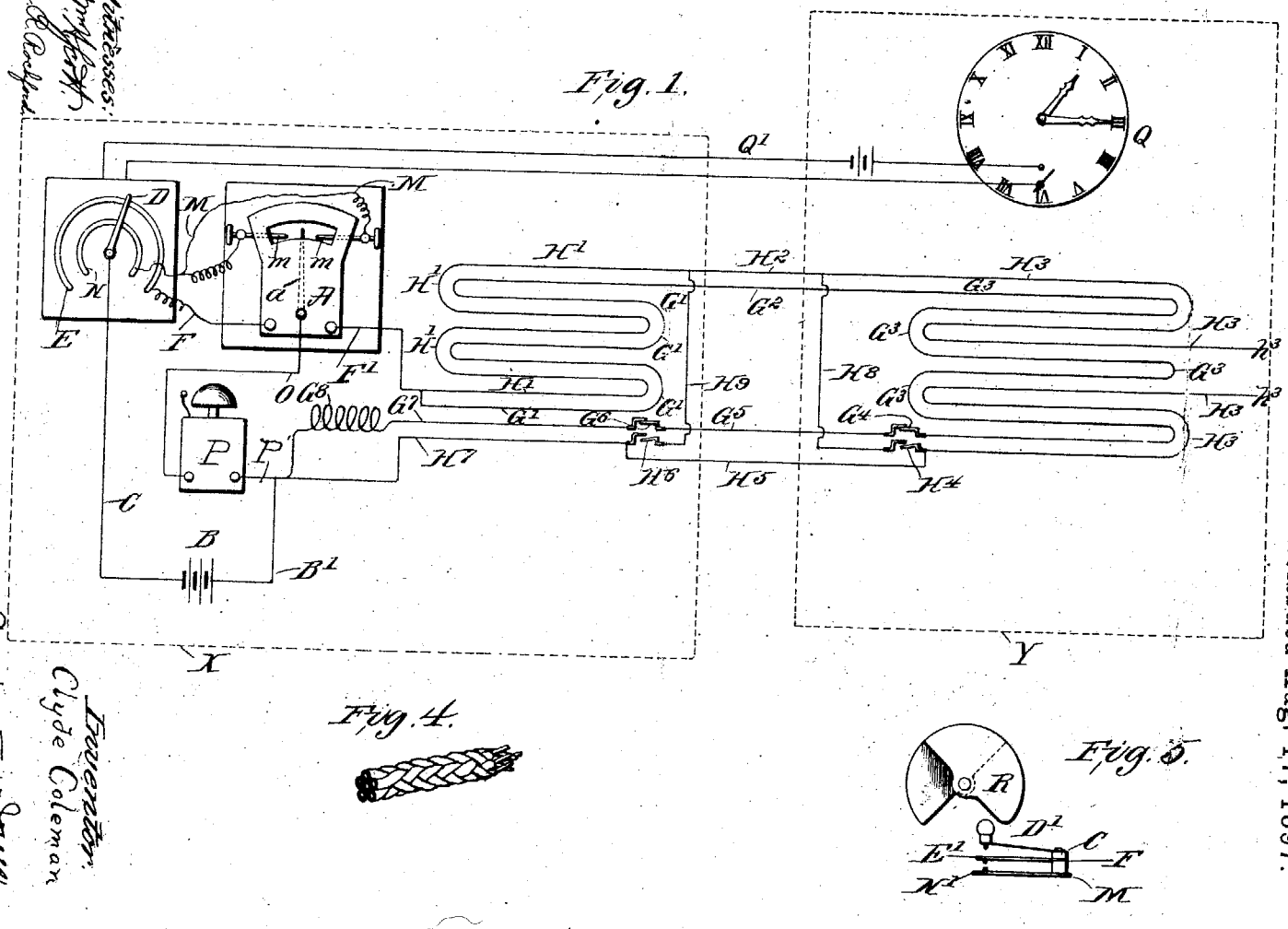
Witnesses:
M. H. Goff
M. R. Rockford.
Inventor.
Clyde Coleman
By Ludington & Jones. Attys.

2 Sheets—Sheet 2.
C. COLEMAN.
ELECTRIC BURGLAR ALARM.
No. 11,626. Reissued Aug. 17, 1897.
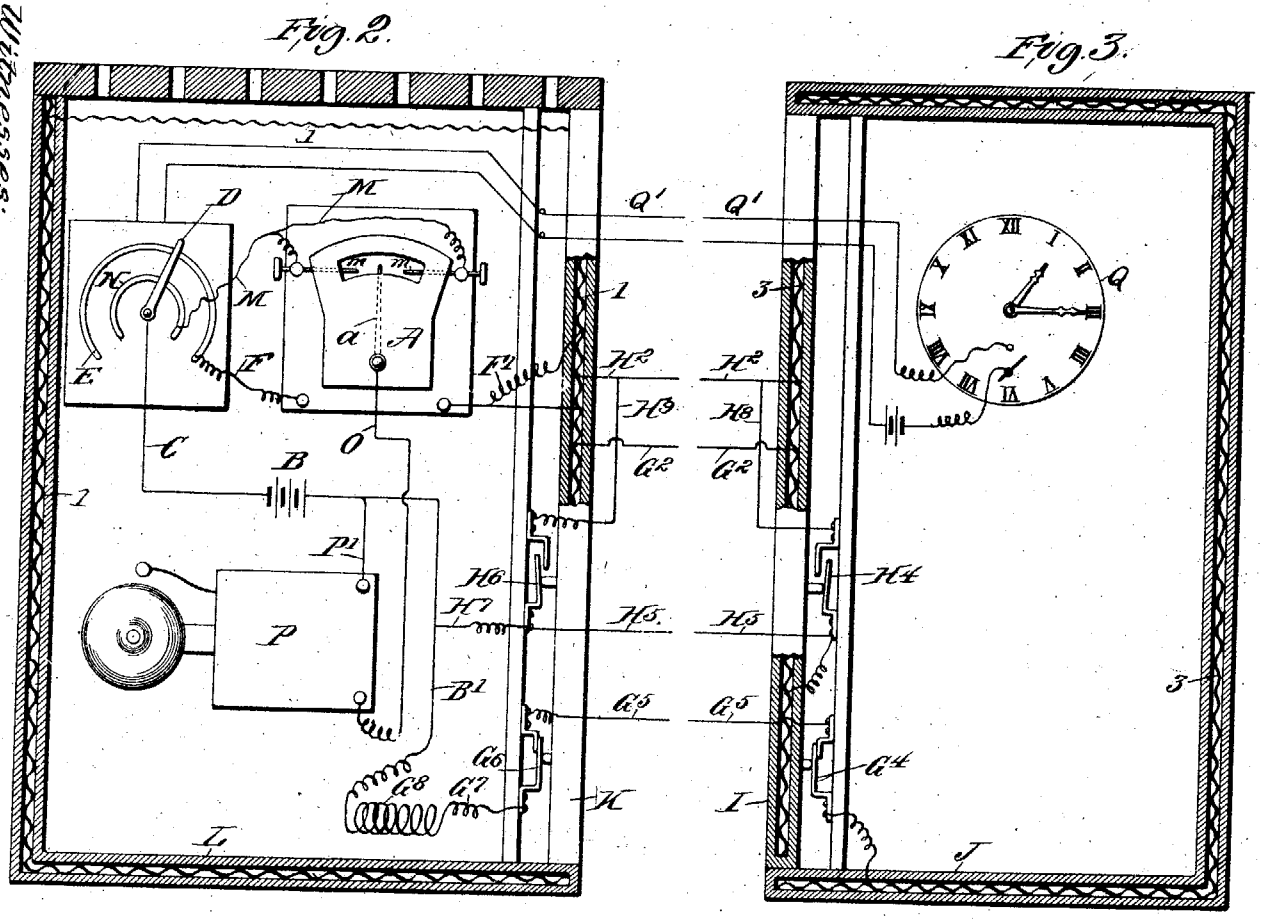
Witnesses:
Wm. H. Scott.
M. R. Rockford.
Inventor:
Clyde Coleman
By Rudington & Jones
Attys.

UNITED STATES PATENT OFFICE.

CLYDE COLEMAN, OF CHICAGO, ILLINOIS, ASSIGNOR OF TWO-THIRDS TO ALBERT L. DEANE AND JAMES W. DONNELL, OF SAME PLACE.

ELECTRIC BURGLAR-ALARM.

SPECIFICATION forming part of Reissued Letters Patent No. 11,626, dated August 17, 1897.

Original No. 570,906, dated November 10, 1896. Application for reissue filed January 18, 1897. Serial No. 619,695.

*To all whom it may concern:*

Be it known that I, CLYDE COLEMAN, a citizen of the United States, residing at Chicago, in the county of Cook and State of Illinois, have invented certain new and useful Improvements in Electric Burglar-Alarms, of which the following is a specification, reference being had to the accompanying drawings, which are made a part hereof, and in which—

Figure 1 is a diagrammatic representation of a burglar-alarm embodying the invention. Fig. 2 is a section of a guarded housing containing the parts that are located at the alarm-station, said parts being shown diagrammatically. Fig. 3 is a vertical section of the guarded structure and a diagrammatic representation of such of the parts as are located within it. Fig. 4 is a detailed view of a braided conductor by which the parts at the alarm-station and guarded structure are electrically connected. Fig. 5 is a detailed view of a modification in the battery-switch and the mechanism for operating it.

In Fig. 1 all of those parts that are included within the dotted line X are supposed to be located at the "alarm-station," by which is meant the place at which the alarm is to be sounded. This place may be the central station of the burglar-alarm system, or a police station, or a station or office where a special watchman is in attendance, or some room within the guarded structure itself, or some place out of doors where, if an alarm is sounded, it will be heard by an outside watchman or other person in the vicinity. For example, where there is no central burglar-alarm station and no watchman within the guarded structure and the system does not extend to a police station the mechanism for sounding the alarm may be arranged on the outside of the guarded structure or the building within which it is located.

All of those parts that are included within the dotted line Y are supposed to be located at the guarded structure, some of them being within the structure itself. By "guarded structure" as used in this specification is meant the building, or the apartment, or the part of a building, or the safe, vault, or other structure which it is desired to protect.

At the alarm-station is located a device A, hereinafter called a "meter," which term as used in this specification is intended to comprehend any device of such construction that it will be influenced by variations in the electrical condition of a main circuit or circuits in which it is included. In the drawings I have shown it included in two main circuits, one of which is normally closed and the other of which is normally open, portions of the wire used in the system being common to both circuits.

B represents the battery, from one pole of which a wire C extends to the arbor of a switch D, which coöperates with a concentrically-arranged contact-plate E, which embraces a greater or a less number of degrees of a circle, according to the length of time during each day it is desired the system shall be in operative condition. From this contact-plate a wire F extends to one of the binding-posts of the meter A, from the other binding-post of which a wire F′ extends to a barrier arranged at the alarm-station. The wire C, the switch D, the contact-plate E, the wire F, the meter A, and the wire F′ are all common to both of the main circuits. The closed main circuit includes also certain parts G′ of the barrier at the alarm-station, a wire $G^2$, extending therefrom to certain parts $G^3$ of a barrier at the guarded structure, closed contacts $G^4$ at the guarded structure, a wire $G^5$, extending from said contacts to similar contacts $G^6$ at the alarm-station, a wire $G^7$, extending from said contacts to a resistance-coil $G^8$, and a wire B′, leading from said resistance-coil to the battery. The open circuit includes portions H′ of the barrier at the alarm-station, a wire $H^2$, leading therefrom to portions $H^3$ of the barrier at the guarded structure, one of two contacts $H^4$, located at the guarded structure, a wire $H^5$, connecting said contact with one of two contacts $H^6$, located at the alarm-station, and a wire $H^7$, leading from said contact to the wire B′. This circuit is open at $h^3$ and the members of the two contacts $H^4$ $H^6$ that are not included in $H^3$ $H^5$ $H^7$ are connected with H′ $H^2$ $H^3$ by wires $H^8$ $H^9$, respectively.

The contacts $G^4$ and $H^4$ are so arranged with relation to the door I of the guarded structure J that when the door is closed the contacts $G^4$ are closed and the contacts $H^4$ open, and when the door is open the contacts $G^4$ are open and the contacts $H^4$ closed.

The contacts $G^6$ and $H^6$ are so arranged with relation to the door K of a guarded housing L that when the door is closed the contacts $G^6$ are closed and the contacts $H^6$ open, and when the door is open the contacts $G^6$ are open and the contacts $H^6$ closed.

The housing L incloses all of the parts that are located at the alarm-station, and the object of the contacts $G^6$ and $H^6$ and of the barrier G′ H′ is to cause an alarm to be sounded should the door of the housing be opened or the condition of either of the main circuits disturbed by attempting to gain access to the interior of the housing in any other way. I have not shown the details of construction of these barriers, since my invention is not limited thereto and the manner of constructing them is fully understood by those skilled in the art. Usually they are constructed of two insulated sets of electrically-connected sheets or strips of metal or of wires laced back and forth or woven in the form of a fabric and arranged within or about the walls of the structure to be guarded in such a manner that they will be broken or the two insulated sets electrically connected if an attempt be made to enter the structure through any part at which the barrier is arranged.

Usually the barrier is arranged on all sides of the structure, and, as far as it can be made to appear in a single sectional view, this is shown in Figs. 2 and 3, the barrier at the alarm-station being here indicated by the reference-number 1 and the barrier at the guarded structure by reference-number 3. However these barriers are constructed some portions of them are included in each of the two main circuits, and while the portions included in one circuit are insulated from the portions included in the other circuit still they are so arranged with relation to each other that a cutting-tool used for gaining entrance to the structure will span the space between them and thereby electrically connect them.

The advantage derived from completely inclosing all of those parts of the system that are located at the alarm-station within a guarded housing is that this housing and its contained alarm mechanism may be located in an exposed place, easy of access, while at the same time it will be impossible to gain access to the vital parts for the purpose of disabling the system without giving an alarm. I am aware that it has been proposed to arrange some of the parts that are located at the alarm-station within a guarded housing, while other of said parts (the alarm-bell itself, for example) are left exposed; but this is not the equivalent of this part of my invention, which is limited to a guarded structure and a second guarded structure, (or "housing," as it is herein called,) within which guarded structure and housing all of the parts of the system, excepting only the electrical conductors which extend from the guarded structure to the guarded housing, are contained.

All of the conductors that extend from the alarm-station to the guarded structure are preferably insulated from each other and are braided or twisted together in a single cable and covered, as shown more clearly in Fig. 4. When so arranged, it is impossible to determine which of them must be coupled in order to cut the guarded structure without causing an alarm to be sounded, and by using a resistance (such as $G^8$) at the alarm-station in combination with a meter, such as above described, if all of the conductors are cut between the alarm-station and the guarded structure an alarm will be sounded. This is due to the fact that the meter is so adjusted with relation to the current normally flowing through the main circuit so long as the system is in operative condition that its needle *a* will normally occupy a central position, and upon a variation in the condition of said current the needle will be deflected to one side or the other, and thereby come in contact with one or the other of two contact-points *m*, which are connected by a wire M with a contact-plate N, arranged in the path of the switch D. This needle is also connected by a wire O with one binding-post of an alarm-bell P, the other binding-post of which is connected by a wire P′ with the wire B′ leading to the battery. The wires B′ C, switch D, contact-plate N, wire M, contact *m*, needle *a*, and wires O, P′, and B′ constitute a local alarm-circuit, through which current is supplied to the alarm-bell P upon any variation in the condition of the current passing through the meter. If the variation is by an increase, the needle will move into contact with one of the contacts *m*, and if it is by a decrease it will move into contact with the other of said contacts, and in either event the alarm-circuit will be completed.

It will be seen that the contact E embraces a greater number of degrees of a circle than the contact N, and as a consequence of this as the switch D rotates, which preferably it does constantly under the influence of any suitable actuating time mechanism, it will first reach the contact E, and thereby throw in the main circuits, and then reach the contact N, and thereby throw in the alarm-circuit, and as its rotation continues it will first leave the contact N, and thereby throw out the alarm-circuit, and then leave the contact E, and thereby throw out the main circuits, and from this time and until it again reaches both of the contacts the system will be inoperative. The object of throwing the main circuits and the alarm-circuits in and out of electrical connection with the battery in the order above described is to prevent an alarm from being sounded upon the variation in the main circuit, which will be due to throwing it in or out of electrical connection with the battery while the alarm-circuit is in electrical connection with the battery.

As before described, the meter is so adjusted that during the passage through it of the normal battery-current its needle will remain at rest between the two contacts *m*, and it therefore follows that when the current is completely cut off from the meter its needle will be deflected and come in contact with one or the other of the contacts *m*. This being so, unless the alarm-circuit has been previously thrown out of electrical connection with the battery an alarm will be sounded. The reverse of this is true when the main circuit is thrown in. I believe myself to be the first to provide an alarm system with a switch operating in this manner, and I therefore desire to have it understood that my present invention is not limited to a switch of any particular construction nor to the manner of operating it. It may be operated manually, but I prefer to operate it automatically by means of some suitable mechanism. To this end I have shown a timepiece at Q, and I have so arranged this timepiece and electrically-operated mechanism for operating the switch D in an electrical circuit Q' that at intervals the timepiece will make and break the circuit, and thereby cause electrical impulses to pass through said operating mechanism and cause the arbor to be rotated continuously in one direction so long as these impulses continue to pass.

The burglar-alarm which forms the subject of this application is intended more particularly for use in connection with a single guarded structure; but it may be used in connection with a plurality of such structures by simply extending the wiring and duplicating the parts herein described as being located at the guarded structure, and it is also the intention that the alarm proper shall be located on the outside of the guarded structure itself or on the outside of a building containing said structure, and in this latter case it is the intention to place the alarm mechanism at a sufficient height above the ground to be out of convenient reach. This being so, it would not be desirable to place within the guarded housing containing the alarm mechanism the clock or other time mechanism for actuating the switch, for the reason that it would be inconvenient to get at it for winding it. It is for this reason that I prefer to place the time mechanism within the guarded structure itself and to connect it with the switch-operating mechanism by means of wires Q', which are preferably braided with the wires of the main circuits, as already described. It is then within convenient reach for being wound.

In Figs. 1 and 2 I have shown two concentric contacts and a rotating switch D, but, as before stated, my invention is not limited to a switch of any particular construction nor to the mechanism for operating it, and in Fig. 5 I have shown a switch and its operating mechanism differing somewhat from that already described. The operating mechanism consists of a cam R, formed in two parts, which are secured to an arbor, so that their positions with relations to each other may be adjusted. Each of them preferably has a circular periphery which embraces one hundred and eighty degrees of a circle, so that they may be so adjusted that one forms a continuation of the other, thereby forming a complete circle, or they may be overlapped, as shown in the drawings, so that their peripheries embrace less than a complete circle. The cam thus constructed is arranged in operative promixity to the switch D' and two contacts E' and N', with which the wires C, F, and M, respectively, are electrically connected. With this arrangement as the cam first rotates it first moves switch D' up to contact E', thereby electrically connecting the wires C and F, and then moves contact E up to contact N', thereby connecting the wire M.

Whether the switch be of one or the other of these constructions there is an interval during which the battery is in circuit and an interval during which the battery is out of circuit, and these intervals depend upon the intervals during each day during which the system is operative and inoperative, respectively.

Preferably one of the walls of the guarded housing is provided with openings in order to permit a free escape of the sound when the alarm is given, and in order to prevent an instrument inserted through these openings from reaching the alarm mechanism the barrier is arranged between this perforated side of the housing and said mechanism.

I do not herein claim specifically a closed main circuit and an interrupted circuit insulated from each other and braided together and charged with electricity at the same potential, this being claimed in an application filed June 29, 1896, Serial No. 597,445.

Having thus described my invention, the following is what I claim as new therein and desire to secure by Letters Patent:

1. In a burglar-alarm the combination of a local alarm-circuit, a main circuit extending from the alarm-station to the guarded structure, a meter electrically connected with the main circuit and adapted to complete the alarm-circuit upon a variation in the condition of the main circuit, and a switch for electrically throwing in first the main circuit and then the alarm-circuit and electrically throwing out first the alarm-circuit and then the main circuit, substantially as set forth.

2. The combination of a local alarm-circuit, a main circuit extending from the alarm-station to the guarded structure, a meter electrically connected with the main circuit and adapted to complete the alarm-circuit upon a variation in the condition of the main circuit, a switch common to both of said circuits so arranged that it throws in first the main circuit and then the alarm-circuit and throws out first the alarm-circuit and then the main circuit, and suitable time mechanism for operating said switch, substantially as set forth.

3. The combination of a local alarm-circuit, a main circuit extending from the alarm-station to the guarded structure, a meter electrically connected with the main circuit and adapted to complete the alarm-circuit, a revoluble switch common to both of said circuits, a contact-plate located in the path of the switch and included in the alarm-circuit, and a longer contact-plate located in the path of the switch and included in the main circuit said contact being so arranged that the switch reaches first the longer one and then the shorter one and leaves first the shorter one and then the longer one, substantially as set forth.

4. The combination of a local alarm-circuit located at the alarm-station, a main circuit extending from the alarm-station to the guarded structure, a meter electrically connected with the main circuit and adapted to complete the alarm-circuit upon a variation in the condition of the main circuit, a switch located at the alarm-station, electrically-operated mechanism for operating said switch, a circuit including said mechanism and extending to the guarded structure, and means located at the guarded structure for controlling said circuit, substantially as set forth.

5. The combination of a local alarm-circuit, located at the alarm-station, a main circuit extending from the alarm-station to the guarded structure, a meter electrically connected with the main circuit and adapted to complete the alarm-circuit upon a variation in the condition of the main circuit, a switch located at the alarm-station, electrically-operated mechanism for operating said switch, a circuit including said mechanism and extending to the guarded structure, and time mechanism located within the guarded structure and having a part arranged in said last-named circuit for controlling it, substantially as set forth.

6. The combination with a structure to be guarded and a housing of an electrical alarm system having its parts so disposed as to protect both the structure to be guarded and the housing and cause an alarm to be sounded if either of them is entered, the alarm proper being arranged within the protected housing and all other parts of the system that may be manipulated or injured so as to cripple the system being arranged within either the structure to be guarded or the protected housing, substantially as set forth.

7. The combination with a structure to be guarded, of a closed main circuit including closed contacts arranged at the guarded structure, an open main circuit including in multiple open contacts arranged at the guarded structure, a meter electrically connected with both of said circuits, and a local alarm-circuit including the meter and adapted to be closed thereby upon a variation in the condition of either of the main circuits, substantially as set forth.

8. The combination with a structure to be guarded and an alarm-station, of a closed main circuit including closed contacts arranged at the guarded structure and at the alarm-station, an open main circuit including in multiple open contacts arranged at the guarded structure and at the alarm-station, a meter electrically connected with both of said circuits, and a local alarm-circuit including the meter and adapted to be closed thereby upon a variation in the condition of either of the main circuits, substantially as set forth.

9. The combination with a structure to be guarded and an alarm-station, of a closed main circuit including closed contacts arranged at the guarded structure an open main circuit including open contacts arranged at the guarded structure, the wires of said circuits between the alarm-station and guarded structure being insulated from each other and braided together, a meter electrically connected with both of said circuits, and a local alarm-circuit including the meter and adapted to be closed thereby upon a variation in the condition of either of the main circuits, substantially as set forth.

10. The combination with a structure to be guarded and a housing located at the alarm-station, of a closed main circuit including closed contacts arranged at the guarded structure, an open main circuit including in multiple open contacts arranged at the guarded structure and housing, the wires of said circuits between the alarm-station and guarded structure being insulated from each other and braided together, a meter electrically connected with both of the main circuits, and a local alarm-circuit including the meter and adapted to be closed thereby upon a variation in the condition of either of the main circuits, the alarm mechanism at the alarm-station being closed by the guarded housing, substantially as set forth.

11. The combination with a structure to be guarded, and an alarm-station, of a closed main circuit including closed contacts arranged at the guarded structure, an open main circuit including open contacts arranged at the guarded structure, a resistance arranged in one of said circuits, a meter electrically connected with both of said circuits, and a local alarm-circuit adapted to be closed by the meter upon a variation of the condition of either of the main circuits, substantially as set forth.

12. The combination with a structure to be guarded and a housing located at the alarm-station, of a closed main circuit including closed contacts arranged at the guarded structure and housing, and a resistance located at the alarm-station, an open main circuit including in multiple, open contacts arranged at the guarded structure and housing, a meter electrically connected with both of the main circuits and a local alarm-circuit including the meter and adapted to be closed thereby upon a variation in the condition of either of the main circuits, substantially as set forth.

13. The combination with a structure to be guarded and a housing located at the alarm-station, of a closed main circuit including a portion of a barrier arranged at the guarded structure and a portion of a barrier arranged at the housing, an open main circuit including a portion of the barrier arranged at the guarded structure and a portion of the barrier arranged at the housing, a meter electrically connected with both of said main circuits and a local alarm-circuit including the meter and adapted to be closed thereby upon a variation in the condition of either of the main circuits, the vital parts located at the alarm-station being all inclosed by the housing, substantially as set forth.

14. The combination with a structure to be guarded and a housing located at the alarm-station, of a closed main circuit including closed contacts located at the guarded structure and housing and portions of barriers located at the guarded structure and housing, an open main circuit, including in multiple, open contacts arranged at the guarded structure and housing and portions of the barriers aforesaid, a meter electrically connected with both of said circuits, and a local alarm-circuit including the meter and adapted to be closed thereby upon a variation in the condition in either of the main circuits, the parts at the alarm-station being included in the guarded housing, substantially as set forth.

15. The combination with a guarded structure and an alarm-station, of a protective circuit extending between the same, a responsive device, an alarm at the alarm-station controlled thereby, a switch at the alarm-station for cutting in the alarm device for a set period of time, and means for controlling said switch from the guarded-structure end of the system, substantially as described.

16. The combination with a guarded structure and an alarm-station, of a protective circuit extending between the same, a responsive device, an alarm at the alarm-station controlled thereby, a switch at the alarm-station for cutting in the alarm device for a set period of time, and time mechanism located within the guarded structure for controlling said switch, substantially as described.

17. The combination with a structure or district inclosed and surrounded by electrical conductors, of an electric protective circuit or circuits including said conductors, an alarm device controlled thereby and at a distance from the protected structure, and a controlling-switch within the electrical barrier at the protected structure for controlling the alarm to permit access to the guarded structure or district, substantially as described.

18. The combination with a structure or district inclosed and surrounded by electrical conductors, of an electric protective circuit or circuits including said conductors, an alarm device controlled thereby and at a distance from the protected structure and time mechanism inclosed within the electrical barrier at the protected district for throwing off the alarm to permit access to the guarded structure, substantially as described.

19. The combination with a structure to be guarded and a housing of an electrical alarm system having its parts so disposed as to protect both the structure to be guarded and the housing and cause an alarm to be sounded if either of them is entered, the alarm proper being arranged within the protected housing, and all other parts of the system that may be manipulated or injured so as to cripple the system being arranged within either the structure to be guarded or the protected housing, and a controlling-switch within the guarded structure for controlling the alarm to permit access to the guarded parts, substantially as described.

20. The combination with a structure to be guarded and a housing, of an electrical alarm system having its parts so disposed as to protect both the structure to be guarded and the housing and cause an alarm to be sounded if either of them is entered, the alarm proper being arranged within the protected housing, and all other parts of the system that may be manipulated or injured so as to cripple the system being arranged within either the structure to be guarded or the protected housing, and time mechanism inclosed within the guarded structure for throwing off the alarm to permit access to the guarded structure, substantially as described.

21. The combination with a structure to be guarded and a housing, of an electrical alarm system having its parts so disposed as to protect both the structure to be guarded and the housing and cause an alarm to be sounded if either of them is entered, the alarm proper being arranged within the protected housing, and all other parts of the system that may be manipulated or injured so as to cripple the system being arranged within either the structure to be guarded or the protected housing, and a braided cable extending between said guarded structure and the housing and containing the protective circuit-conductors, substantially as described.

22. The combination with a structure to be guarded and a housing of an electrical alarm system having its parts so disposed as to protect both the structure to be guarded and the housing and cause an alarm to be sounded if either of them is entered, the alarm proper being arranged within the protected housing, and all other parts of the system that may be manipulated or injured so as to cripple the system being arranged within either the structure to be guarded or the protected housing, a switch within the guarded structure, switch-wires connected therewith and extending from the protected structure to the housing for controlling the alarm, and a braided cable extending between the guarded structure and the housing and containing the switch-wires and the protective circuit-wires, substantially as described.

23. The combination with a guarded structure, of a guarded housing constructed to permit the escape of sounds produced therein, an alarm within said housing, and a protective circuit or circuits protecting both said guarded structure and said guarded housing against entrance, substantially as described.

24. The combination with a guarded structure of a guarded housing having openings to permit the escape of sounds produced therein, an alarm within said housing, and a protective circuit or circuits protecting both said guarded structure and said guarded housing against entrance, substantially as described.

25. The combination with a structure to be guarded and a housing, of an electrical alarm system having its parts so disposed as to protect both the structure to be guarded and the housing and cause an alarm to be sounded if either of them is entered, the alarm proper being arranged within the protected housing, and all other parts of the system that may be manipulated or injured so as to cripple the system being arranged within either the structure to be guarded or the protected housing, switch mechanism for controlling the alarm and located within the said housing and means located exterior to the guarded housing for controlling said switch, substantially as described.

In witness whereof I have hereunto subscribed my name in the presence of two witnesses.

CLYDE COLEMAN.

Witnesses:
W. CLYDE JONES,
R. S. LUDINGTON.